United States Patent [19]

Combastet

[11] Patent Number: 4,800,778
[45] Date of Patent: Jan. 31, 1989

[54] MECHANICAL SYSTEM FOR THE CONTINUOUS AND STAGED CONVERSION OF A TORQUE

[76] Inventor: M. Michel Combastet, 25, rue du Faubourg Saint-Honoré, 75008 Paris, France

[21] Appl. No.: 38,156

[22] Filed: Apr. 14, 1987

[30] Foreign Application Priority Data

Apr. 24, 1986 [FR] France .................... 86 05958

[51] Int. Cl.⁴ .......................................... F16H 37/06
[52] U.S. Cl. .................................... 74/682; 74/705
[58] Field of Search .............. 74/700, 701, 682, 705, 74/740, 665 F, 665 E, 665 GB, 665 GC; 192/4 A, 4 R, 7, 4 C

[56] References Cited

U.S. PATENT DOCUMENTS

| 322,796 | 7/1885 | Coffield | 74/705 |
|---|---|---|---|
| 2,480,032 | 8/1949 | Kochis | 74/682 |
| 2,973,669 | 3/1961 | Quigley | 74/682 |
| 3,094,967 | 6/1963 | Willis, Jr. | 74/682 |
| 3,645,152 | 2/1972 | Olcer | 74/682 |
| 4,077,278 | 3/1978 | Combastet | 74/682 |
| 4,080,847 | 3/1978 | Thomas | 74/682 X |
| 4,109,551 | 8/1978 | Nemec | 74/705 |
| 4,216,925 | 8/1980 | Mendiberri | 74/665 K X |
| 4,613,292 | 9/1986 | Bernstrom et al. | 192/4 A X |

FOREIGN PATENT DOCUMENTS

| 0014578 | 8/1980 | European Pat. Off. . | |
| 3007593 | 9/1980 | Fed. Rep. of Germany | 74/682 |
| 3424421 | 1/1986 | Fed. Rep. of Germany . | |
| 0382243 | 2/1908 | France . | |
| 2327454 | 5/1977 | France . | |
| 2450385 | 9/1980 | France . | |
| 510337 | 6/1955 | Italy | 74/682 |
| 0473677 | 1/1936 | United Kingdom . | |

Primary Examiner—Dirk Wright
Attorney, Agent, or Firm—Sandler & Greenblum

[57] ABSTRACT

A torque converter acts by continuous differential retroaction with a staging of fixed gear ratios. Two differential gears are included in the transmission, one of which receives power through its cage on one side, and outputs power through its two side gears on the otherside. The other differential receives both of the outputs from the first differential on one side, and outputs power through the carrier to the other side. A forward reverse fixed gearing is driven by the output from the second differential and drives an output shaft. The output shaft is coaxial to the input shaft.

1 Claim, 1 Drawing Sheet

MECHANICAL SYSTEM FOR THE CONTINUOUS AND STAGED CONVERSION OF A TORQUE

FIELD AND BACKGROUND OF THE INVENTION

The present invention relates to a mechanical torque converter system.

Over the past forty years, torque converters for replacing the standard gear boxes with sets of gears have been studied. Indeed, the advantage of the torque converters is that they use to the maximum the performance of an engine by maintaining said engine longer at the speed for which it provides its maximum torque. Presently, there exist hydraulic and mechanical torque converters.

The owner of the present invention has been led to study some years ago a simple and robust torque converter, of reasonable cost price and easy to maintain. Such a mechanical torque converter is disclosed in French Pat. No. 75 31 066, published under No. 2 327 454 and in the Certificate of Addition No. 79 05 143 published under No. 2 450 385.

The torque converter according to this prior technique acts via a differential retroaction and is made of two differential gears; the cage, of the inlet on the first differential gear, receives the power to be transmitted, and the cage at the outlet of the second differential gear drives the receiving member, the two differential gears having their shafts driven by the planetaries coupled two by two on the same side by two trains of gears.

OBJECTS AND SUMMARY OF THE INVENTION

The present invention aims at providing improvements to this type of converter so as to obtain a continuous torque variation, without slippage, and the control of a staging of fixed ratios.

To this effect, the invention relates to a mechanical torque converter system acting by a continuous differential retroaction and a staging of fixed ratios, comprising two differential gears, the cage of the first differential gear receiving the power from the engine motion input shaft and the output shaft of the second differential cage driving the system output shaft, the two differential gears having their four planetaries coupled two by two, characterized in that:

the engine motion input shaft and the system power output shaft are coaxial;

the motion is transmitted through each differential gear by planetary shafts which are coaxial to each other and coaxial to the two connected shafts, respectively, one of the input cage and the other of the output cage, so that the motions of the planetaries are output on the same side, opposite each shaft which is connected to each cage; and it includes a device allowing obtaining a staging of fixed ratios between the rotation speeds at the input and the output; a rotation of the converter system output shaft in one direction and in the other; a disconnection of the output shaft in order to obtain a dead point, and the blocking of the output shaft rotation.

The torque converter system according to the invention allows also providing a direct connection between the engine motion input shaft and the system power output shaft. To this effect, according to a feature of this invention, means are provided for connecting on the one hand the input shaft, the central planetary shaft and the power output shaft, and on the other hand for disconnecting the two differential gears.

According to a variant of the invention, the direct connection between the system input shaft and output shaft is provided on the one hand by connecting the two differential planetaries with the power output shaft and on the other hand by disconnecting simultaneously the two differential gears.

According to another feature of this invention, the connection between the shaft connected to the output cage of the second differential gear, or output differential gear, and the system power output shaft, coaxial to the motion input shaft, can be provided via one or several sets of gears, with a stage control, so as to obtain the staging of fixed ratios between the rotation speeds at the input and at the output, the rotation of the output shaft in one direction and in the other, said dead point and the blocking.

According to another feature of this invention, the two planetary shafts of the first differential gear, or input differential gear, are respectively connected to the two planetary shafts of the second differential gear via two appropriate reduction gears

BRIEF DESCRIPTION OF THE DRAWING

Other features and advantages of the invention will become more apparent from the hereafter description with reference to the accompanying drawing which illustrates two embodiments thereof, without any limiting character.

In the drawing.

DETAILED DESCRIPTION OF THE INVENTION

Figure 1:
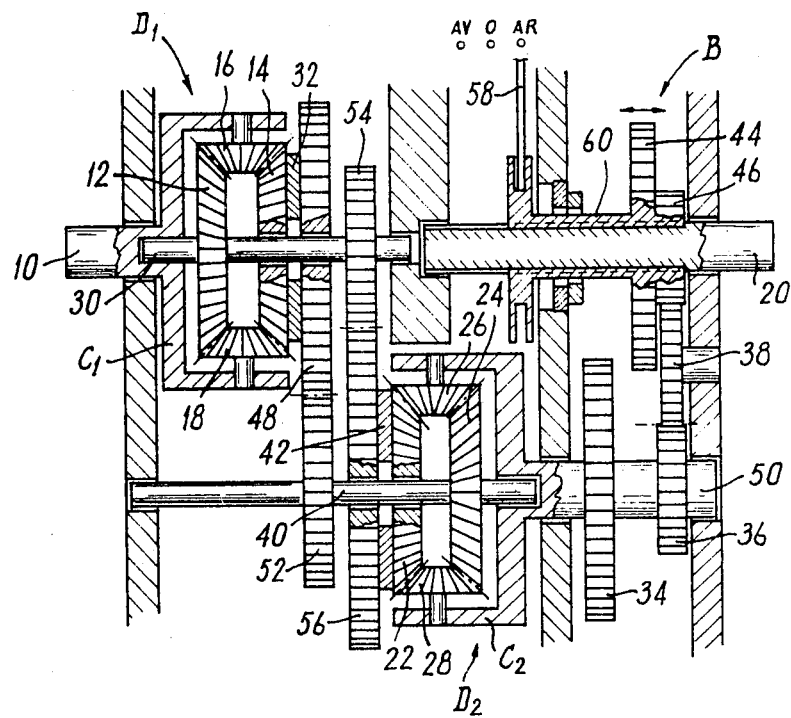
FIG. 1 is a schematic view of a first embodiment of the invention.

With reference to the drawing, one sees that the torque converter according to the invention is substantially made of a torque variator with continuous variation without slippage, comprised of two differential gears $D_1$ and $D_2$, respectively called input differential gear and output differential gear, coupled to each other as will be seen hereinafter via reduction gears and of devices for staging fixed ratios, the reversal, a dead point and the blocking of the output shaft rotation, shown generally by reference B.

As may be seen in the drawing, each differential gear $D_1$ and $D_2$ is characterized by the singleness of the axis of the motion input and output members, viz. the cage and the two planetaries. Cage $C_1$ of the input differential gear $D_1$ is in relation with the outer motion via the motion input shaft 10, which is rigidly connected thereto. Said cage $C_1$ carries, as shown, satellites 16, 18, and the planetaries 12, 14 of the input differential gear are mounted on planetary shafts 30, 32 concentrical and coaxial, arranged so that their motion is output from the side opposite to shaft 10 which is rigidly connected to cage $C_1$.

The arrangement is the same as regards the output differential gear $D_2$. Its cage $C_2$ is rigidly connected to the motion output shaft 50 and it carries, as known, the satellites 26, 28. The planetaries 22, 24 of the output differential gear $D_2$ are mounted on planetary shafts 40, 42, concentrical and coaxial, arranged so that their motions are input from the side opposite the output shaft 50.

The two planetary shafts 30, 32 of the input differential gear $D_1$ are respectively connected to the two planetary shafts 40, 42 of the output differential gear $D_2$ via gears 48, 52, 54, 56 of determined demultiplication.

According to an essential feature of this invention, the motion input shaft 10 is coaxial to the torque converter system power output shaft 20. To this effect, the motion output shaft 50 of output differential gear $D_2$ is provided with two gears 34, 36 which can respectively mesh with gears 44, 46 keyed onto the power output shaft 20, in alignment with the input shaft 10. A reversal shaft for the rotation direction 38 is interposed between gears 46 and 36.

The device B, comprised of gears 34, 36, 38, 44, 46, allows therefore performing the four following functions:

a staging of fixed ratios between the rotations speeds at the input and the output;

a rotation of the converter system output shaft 20 in one direction or in the other: to this end, gears 44, 46 are mounted on a fluted shaft 60, which can move along shaft 20 under the control of a manual means such as a fork 58, or any other appropriate means such as mechanical, electrical, electromagnetical, pneumatic, hydraulic or electronic;

the disconnection of the output shaft 20 so as to obtain a dead point;

the blocking of the rotation of the power output shaft 20.

The converter according to the invention provides a direct connection between the input shaft 10 and the power output shaft 20. To this effect, means (not shown) are provided for:

on the one hand connecting the input shaft 10, the planetary shaft 30 of the input differential gear $D_1$ and the power output shaft 20;

on the other hand disconnecting the connection between the two differential gears $D_1$ and $D_2$.

Said means can be provided in the form of a mechanical, electromagnetic or hydraulic clutch, with discs or claws, or via a gear slipping mechanism.

Figure 2:
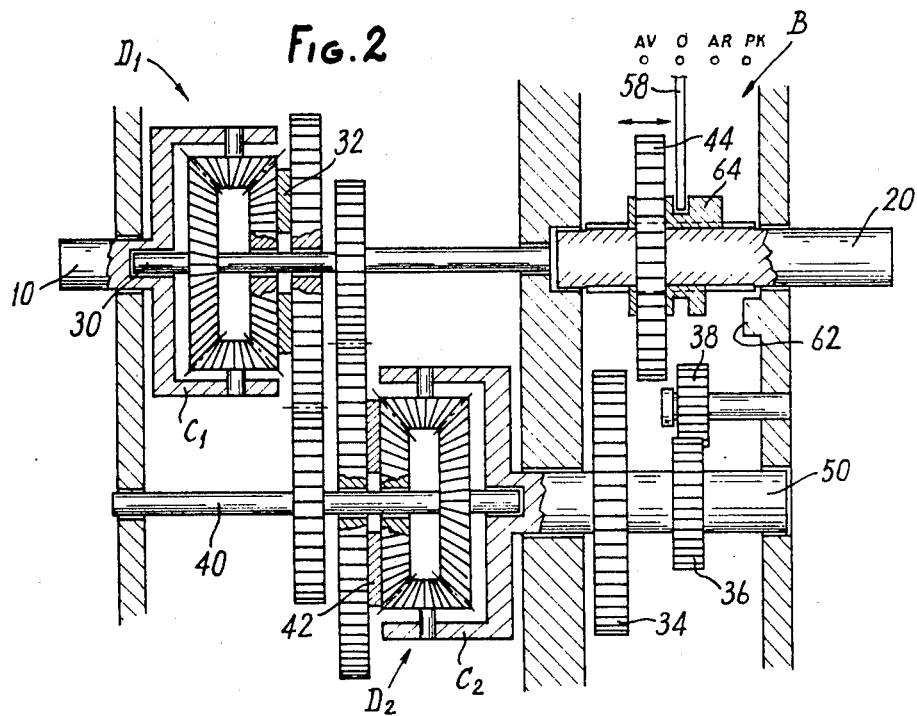
FIG. 2 is a view similar to FIG. 1, showing a second embodiment.

The variant shown in FIG. 2 is different from the embodiment shown in FIG. 1 only as regards the way casing B is made, and by the fact that the reversal gear 38 is off center with respect to gears 34, 36 and 44. The blocking of the rotation of the power output shaft 20 is provided by two protrusions 62, 64, when said protrusions are in engagement against each other.

One will understand from the reading of the foregoing disclosure that the torque converter according to the invention allows obtaining normally a rotation direction of the power output shaft 20 identical to that of the motion input shaft 10, and providing a motion in the reverse direction, or reverse motion, more or less geared down, by a continuous variation or stepwise.

The possible applications of the torque converter according to this invention are notably the following: motion transmission in machine-tools; transmision of torques in vehicles, or land, sea or air transport means, lifting, handling or boring apparatus, etc., for providing servomechanisms and micromechanisms, torque limiting apparatus, coupling of energy production groups.

Obviously, this invention is not limited to the various embodiments shown and described, and it encompassses all their variants.

What I claim is:

1. A torque converter system comprising a first differential gear and a second differential gear, said first differential gear and said second differential gear each being provided with a cage, wherein the cage of the first differential gear is an input cage for receiving power from an engine motion input shaft and said cage of said second differential gear is an output cage, said second differential gear being provided with an output shaft for driving a system output shaft, said first differential gear and said second differential gear having four planetary shafts coupled two by two, wherein the system output shaft is coaxial with the engine motion input shaft whereby motion is transmitted through each said differential gear by planetary shafts which are coaxial to each other and coaxial to a shaft connected, respectively, to the input cage and the output cage, whereby the motion of the planetary shafts are output on the same side, opposite each shaft which is connected to each said cage; said torque converter system further comprising means for obtaining a staging of fixed ratios between rotation speeds of the output shaft; means for rotating the system output shaft in one direction and in another direction; and means for disconnecting the system output shaft in order to obtain a dead point, and means for blocking rotation of the system output shaft.

* * * * *